United States Patent
Mita et al.

(10) Patent No.: US 8,514,459 B2
(45) Date of Patent: Aug. 20, 2013

(54) COMMUNICATION DEVICE

(75) Inventors: Teruki Mita, Tokyo (JP); Yoshihiro Ariyama, Tokyo (JP); Hiroaki Harada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1014 days.

(21) Appl. No.: 12/155,791

(22) Filed: Jun. 10, 2008

(65) Prior Publication Data

US 2009/0009818 A1    Jan. 8, 2009

(30) Foreign Application Priority Data

Jul. 2, 2007 (JP) ................................. 2007-174017

(51) Int. Cl.
*H04N 1/00* (2006.01)
*H04N 1/32* (2006.01)

(52) U.S. Cl.
USPC ........... 358/434; 358/435; 358/436; 358/437; 358/442; 370/298; 370/352

(58) Field of Classification Search
USPC ......... 358/434, 435, 436, 437, 442; 370/298, 370/352
See application file for complete search history.

(56) References Cited

U.S. PATENT DOCUMENTS 7,907,708 B2 * 3/2011 Walker et al. .............. 379/93.09
2003/0072272 A1 * 4/2003 Koide et al. .................. 370/298

FOREIGN PATENT DOCUMENTS

| JP | 2003-125186 | | 4/2003 |
| JP | 2006-121176 | | 5/2006 |
| JP | 2006121176 A | * | 5/2006 |

* cited by examiner

*Primary Examiner* — Steven Kau
*Assistant Examiner* — Quang N Vo
(74) *Attorney, Agent, or Firm* — Rabin & Berdo, P.C.

(57) ABSTRACT

A communication device transmits voice and facsimile signals in the same channel between a terminal device and a packet network. The communication device has an echo canceler and a jitter buffer. The jitter buffer has a delay recovery control function that selectively deletes data from the jitter buffer to recover from packet delays. After detecting a facsimile tone, the communication device waits to detect a certain interval of silence, then deactivates its echo canceler and delay recovery control function and switches into facsimile communication mode. If a certain interval of silence is detected during the facsimile transmission, the communication device reactivates its echo canceler and delay recovery control function and continues communicating in voice mode if the line is left connected.

9 Claims, 5 Drawing Sheets

COMMUNICATION DEVICE

BACKGROUND OF THE INVENTION

1. Field of the Invention

The present invention relates to a communication device that mediates both voice and in-band facsimile communication between a terminal device and a packet network.

2. Description of the Related Art

Facsimile machines have traditionally been used to send digitized image data over telephone lines. With the increasing migration of telephone communication to packet networks such as the Internet, facsimile machines and telephone sets may now be connected to a type of communication device that functions as an adapter or gateway by converting voice and facsimile signals to packet data in the outgoing direction, and converting packet data to voice and facsimile signals in the incoming direction. Facsimile communication may take place either in-band, using the same channel as used for voice communication, or out-of-band, using a separate signaling channel.

Like ordinary telephone equipment, these gateway devices include echo cancelers that predict and cancel echoes of the incoming signal in the outgoing signal. To compensate for the delays that tend to occur in packet networks, gateway devices also have jitter buffers in which arriving packets are temporarily stored to allow delayed packets to catch up with the packet flow.

To prevent overflow of the jitter buffer, which could seriously degrade voice communication, some gateway devices have an automatic delay recovery control function that selectively deletes data from the jitter buffer, the amount deleted being small enough that the user does not notice any difference in the received voice signal. Japanese Patent Application Publications No. 2003-125186 and 2006-121176 disclose examples of voice gateway devices of this type.

The present invention is concerned with gateway devices that perform in-band facsimile communication and have a delay recovery control function.

In-band facsimile communication takes place in five phases:

Phase A: call setup (calling and answering tones)
Phase B: pre-message procedure (capabilities negotiation and training)
Phase C: message transmission (image data)
Phase D: post-message procedure (end-of-message confirmation)
Phase E: disconnection In the gateway device, phase A takes place in the voice communication mode, with the echo canceler and delay recovery control function enabled. When the calling and answering tones have been sent and received, the gateway device switches into a facsimile mode in which the echo canceler and delay recovery control function are deactivated. Facsimile transmissions would not succeed if the sending device were to subtract predicted echo signals from the outgoing facsimile data, or if the receiving communication device were arbitrarily to delete small amounts of received facsimile data from its jitter buffer. Phases B, C, and D take place in the facsimile mode. After disconnection in phase E, the gateway device switches back to the voice mode and waits for the next call.

Problems have been found to occur in the switchovers both from voice mode to facsimile mode and from facsimile mode to voice mode.

For example, a gateway device may switch from voice mode to facsimile mode too early, while the device with which it is communicating is still sending a phase-A tone signal. The remaining part of the tone signal then interferes with operations in phase B.

At the end of the facsimile transmission, since the gateway device waits until the line has been disconnected before reactivating the echo canceler and delay recovery control function, the echo canceler and delay recovery control function are not reactivated if the line is left connected for continued voice communication, which may occur when, for example, the facsimile transmission is conducted as part of a teleconference call. The continuing voice communication may then be impaired by echo or buffer overflow problems.

Accordingly, there is a need for more reliable switchovers between the voice and facsimile communication modes.

SUMMARY OF THE INVENTION

An object of the present invention is to provide a communication device with a delay recovery control function that is deactivated at the proper time at the beginning of a facsimile transmission, after tone transmission has ceased.

Another object is to assure that the delay recovery control function is properly reactivated at the end of the facsimile transmission, even if the line is not disconnected.

Yet another object is to provide a communication device with an echo canceler that is deactivated at the proper time at the beginning of a facsimile transmission, after tone transmission has ceased.

Still another object is to assure that the echo canceler is properly reactivated at the end of the facsimile transmission, even if the line is not disconnected.

A communication device according to the present invention transmits voice and facsimile signals between a terminal device to which the communication device is connected and a distant device to which the communication device is connected by a voice communication channel carried over a packet network. The communication device has an echo canceler and a jitter buffer. The jitter buffer has a delay recovery control function that selectively deletes data from the jitter buffer to recover from packet delays.

The communication device has a facsimile tone detector that detects facsimile tones in packets received from the distant device through the voice communication channel, a silence detector that detects silence after a facsimile tone has been detected, and a jitter buffer control unit. When the silence detected by the silence detector has continued for a predetermined time, the jitter buffer control unit deactivates the delay recovery control function and causes the jitter buffer to output silent data for another predetermined time.

The jitter buffer control unit preferably reactivates the delay recovery control function if the silence detector detects silence continuing for yet another predetermined time during facsimile communication.

The communication device preferably also has an echo canceler control unit for deactivating the echo canceler when the facsimile tone detector detects an answering tone, and reactivating the echo canceler if the silence detector detects silence continuing for the predetermined time during facsimile communication.

By monitoring tone and silence detection, the control units assure that the delay recovery control function and the echo canceler are not deactivated until tone transmission has ceased.

By monitoring silence detection during facsimile communication, the control units can assure that the delay recovery control function and the echo canceler are reactivated at the end of the facsimile transmission, even if the line is not disconnected.

DETAILED DESCRIPTION OF THE INVENTION

An embodiment of the invention will now be described with reference to the attached drawings, in which like elements are indicated by like reference characters.

Figure 1:
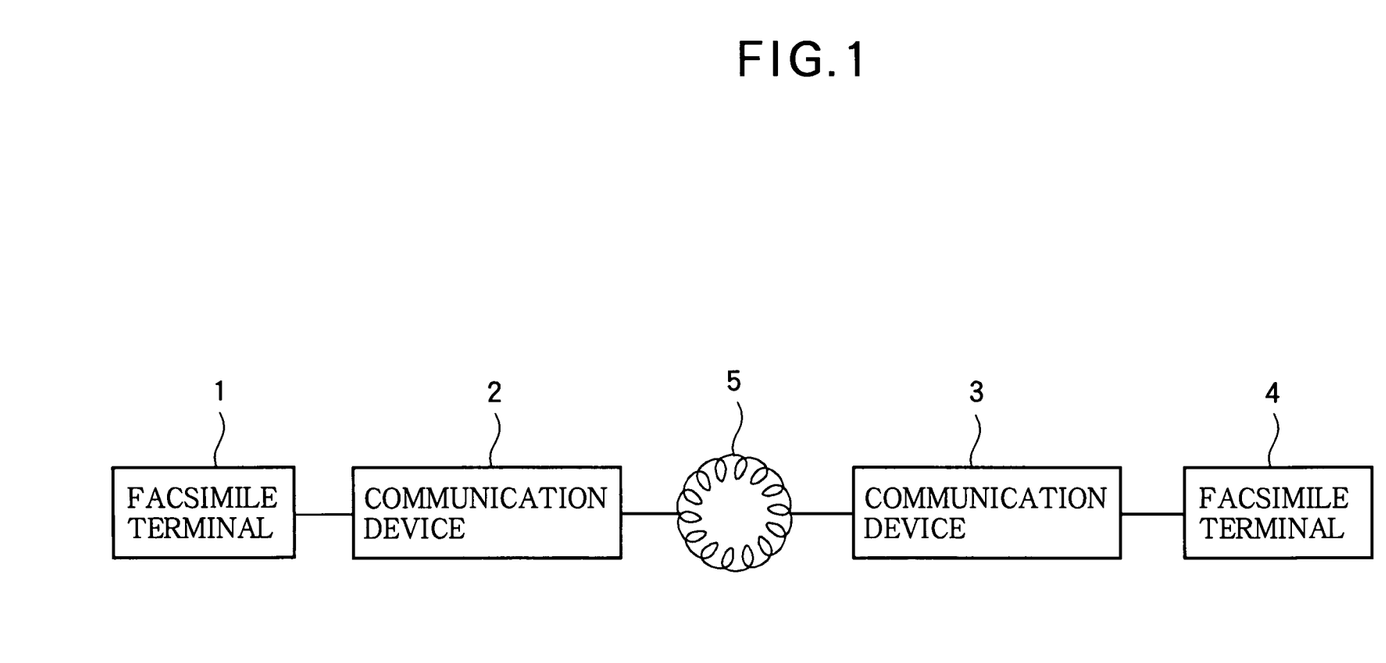
FIG. 1 is a block diagram illustrating connections among communication devices and terminals.

In FIG. 1, a facsimile terminal 1 that also functions as a telephone set is connected by an analog line to a communication device 2, which is connected through an Internet protocol (IP) network 5 to another communication device 3. Communication device 3 is connected by another analog line to another facsimile terminal 4.

In the present embodiment, it will be assumed that the communication devices 2, 3 send and receive packets on the IP network 5 by use of the realtime transport protocol (RTP), a standard protocol used for multimedia data streams.

Figure 2:
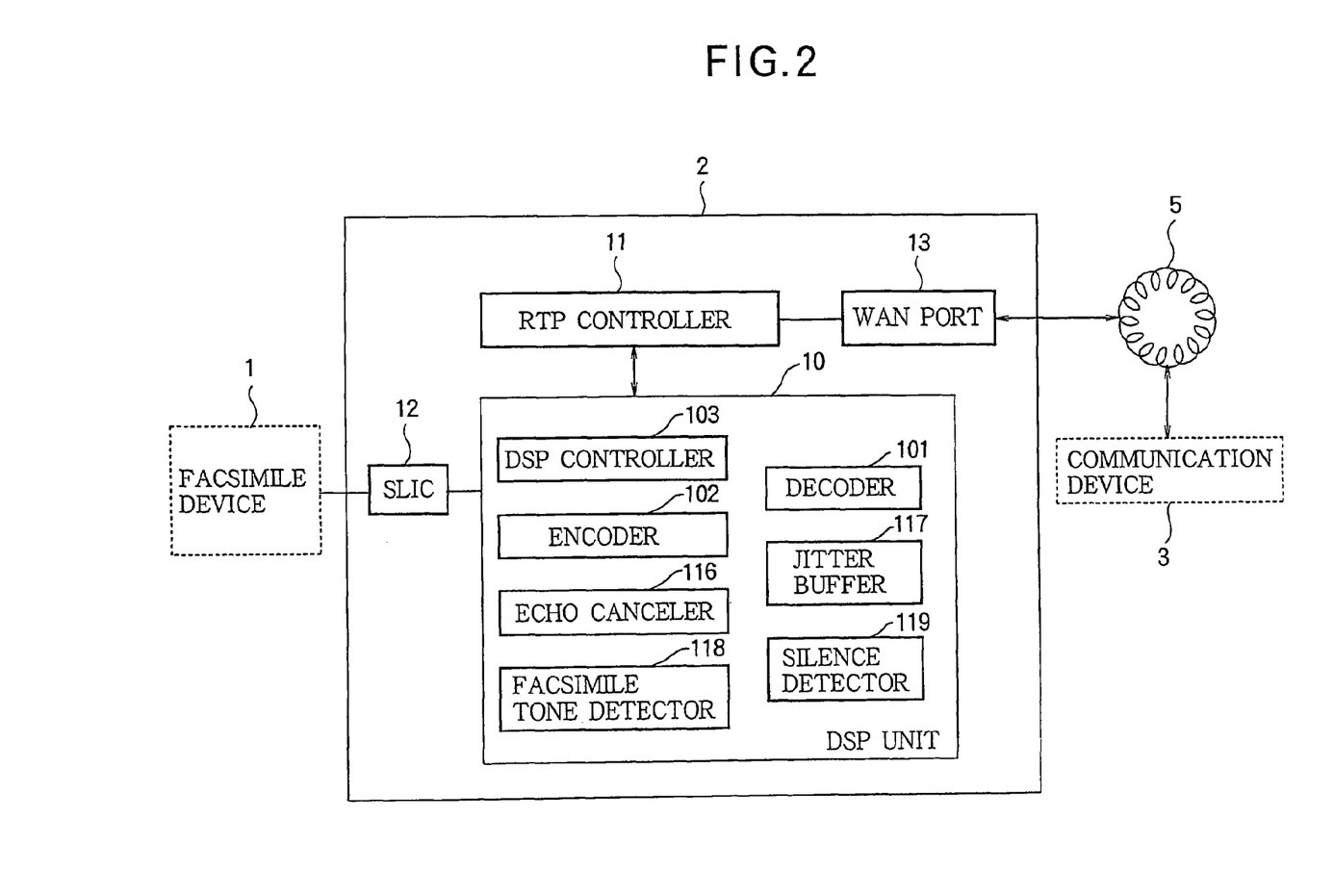
FIG. 2 is a block diagram illustrating the structure of the communication devices in FIG. 1.

Referring to FIG. 2, communication device 2 comprises a digital signal processor (DSP) unit 10, an RTP controller 11, a subscriber line interface circuit (SLIC) 12, and a wide area network (WAN) port 13. The DSP unit 10 includes a decoder 101, an encoder 102, a DSP controller 103, an echo canceler 116, a jitter buffer 117, a facsimile tone detector 118, and a silence detector 119. Communication device 3 has the same structure as communication device 2.

The DSP unit 10 converts packets received from communication device 3 through the IP network 5 to analog signals and sends the analog signals to facsimile terminal 1. The DSP unit 10 also converts analog signals received from facsimile terminal 1 to digital data, places the data in packets, and sends the packets to communication device 3 through the IP network 5.

The decoder 101 reconstructs digital facsimile tone and data signals and voice data signals from the data segments included in RTP packets that have been received from communication device 3 and stored in the jitter buffer 117. The decoder 101 also converts the reconstructed digital signals to analog signals and sends the analog signals to the SLIC 12.

An example of a facsimile tone is the station identification tone (CED) specified in ITU-T Recommendation T.30 ('Procedures for Document Facsimile Transmission in the General Switched Telephone Network') of the Telecommunications Sector of the International Telephone and Telegraph Union (ITU-T). In the description below, unless otherwise specified it will be assumed that the decoded facsimile tones are CED tones.

The encoder 102 receives facsimile tones, facsimile data, and voice signals as analog signals from the facsimile terminal 1 through the SLIC 12 and converts these analog signals to RTP packets with payloads of digital data representing the facsimile tones, facsimile data, and voice signals.

Next, the operation of the DSP controller 103 will be described in detail with reference to FIG. 3, in conjunction with which the operations of the echo canceler 116, jitter buffer 117, facsimile tone detector 118, and silence detector 119 will also be described.

Figure 3:
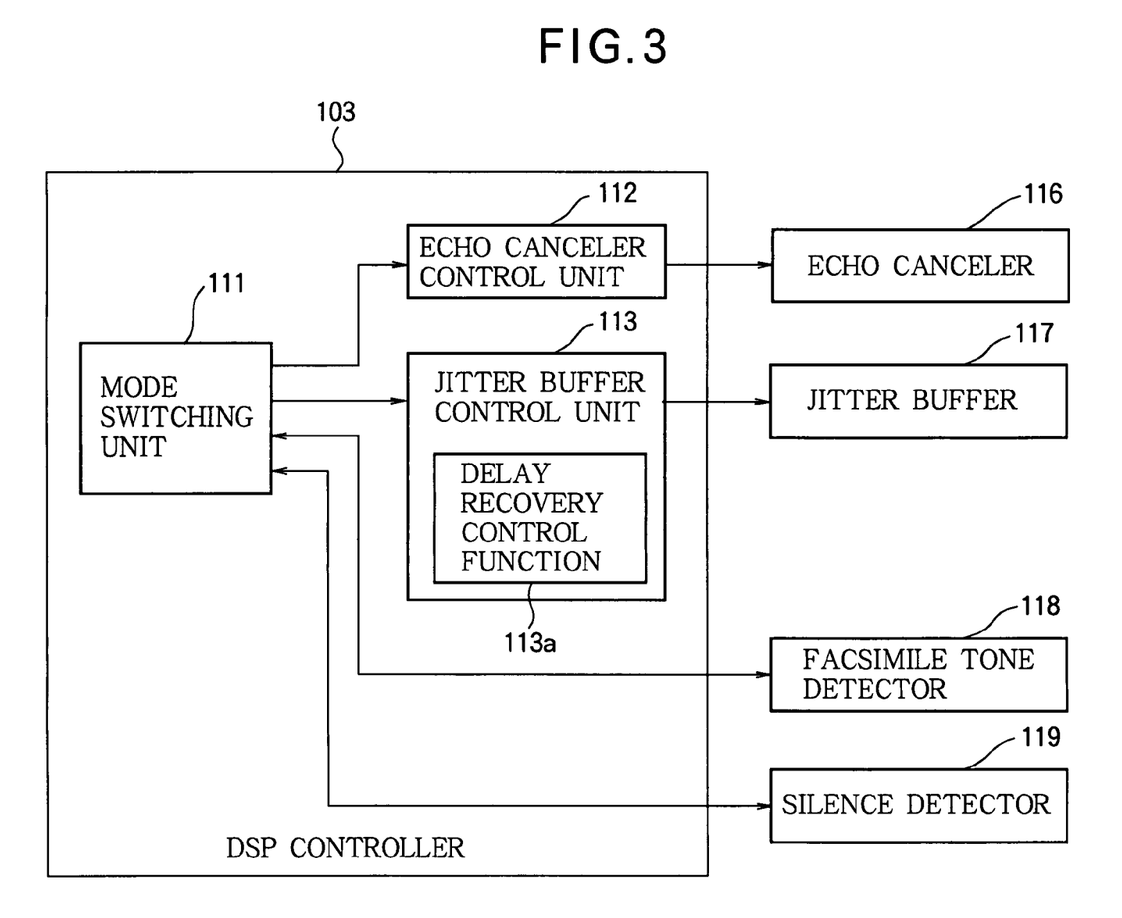
FIG. 3 is a block diagram illustrating the structure of the DSP controller in FIG. 2.

Referring to FIG. 3, the DSP controller 103 comprises a mode switching unit 111, an echo canceler control unit 112, and a jitter buffer control unit 113 with a delay recovery control function 113a.

The mode switching unit 111 generally has the echo canceler control unit 112 deactivate the echo canceler 116 on switchover from voice mode to facsimile mode, and reactivate the echo canceler 116 on switchover from facsimile mode to voice mode. To comply with international standards such as ITU-T recommendation G.168 ('Digital Network Echo Cancellers'), however, in some cases the echo canceler 116 is not deactivated even though the operating mode has been switched to facsimile mode. These cases are of particular concern in the present invention.

The mode switching unit 111 has the jitter buffer control unit 113 deactivate the delay recovery control function 113a on switchover from voice mode to facsimile mode, and reactivate the delay recovery control function 113a on switchover from facsimile mode to voice mode.

The delay recovery control function 113a is a function that selectively deletes voice data stored in the jitter buffer 117 to prevent voice communication degradation, the amount of data deleted being too small to make any noticeable difference in the reproduced voice signal. These selective deletions reduce delays in the voice signal and leave enough free space in the jitter buffer 117 to deal with the sudden arrival of a clump of RTP packets, an event that may occur due to network traffic conditions.

The mode switching unit 111 also activates the silence detector 119, if, in voice mode, the facsimile tone detector 118 notifies the mode switching unit 111 that a facsimile tone (CED tone) has been detected. Subsequently, if the silence detector 119 notifies the mode switching unit 111 that silence continuing for a first predetermined time has been detected, the mode switching unit 111 has the jitter buffer control unit 113 output continuous silent data for a second predetermined time.

In facsimile mode, the mode switching unit 111 also monitors the silence detector 119. If the silence detector 119 notifies the mode switching unit 111 that silence continuing for a third predetermined time has been detected, the mode switching unit 111 has the echo canceler control unit 112 reactivate the echo canceler 116 if required, and has the jitter buffer control unit 113 reactivate the delay recovery control function 113a.

Upon receiving a request from the mode switching unit 111 to activate the echo canceler 116, the echo canceler control unit 112 outputs an activating command to the echo canceler 116. Similarly, upon receiving a request from the mode switching unit 111 to deactivate the echo canceler 116, the echo canceler control unit 112 outputs a deactivating command to the echo canceler 116.

In response to a silent data output request from the mode switching unit 111, the jitter buffer control unit 113 halts output from the jitter buffer for a predetermined fixed time and uses the interpolation function of the decoder 101 (in FIG. 2) to transfer silent data to the facsimile terminal 1, thereby inserting a fixed delay.

The jitter buffer control unit 113 deactivates and reactivates the delay recovery control function 113a at the request of the mode switching unit 111.

The echo canceler 116 is activated and deactivated by the echo canceler control unit 112. When activated, the echo canceler 116 outputs a predicted echo signal that cancels echoes of the incoming signal so that the echoes are not sent back to the other party's facsimile terminal 4.

The jitter buffer 117 is a memory for storing RTP packets representing facsimile data, facsimile tones, and voice data sent from communication device 3 (in FIG. 1), and silent data representing silence.

If the facsimile tone detector 118 receives a decoded signal that it identifies as representing a facsimile tone (CED tone) from the decoder 101 (in FIG. 2), the facsimile tone detector 118 notifies the mode switching unit 111 that it has detected a facsimile tone sent by communication unit 3 (in FIG. 1).

The silence detector 119 detects silent intervals in the signals processed by the decoder 101 and the encoder 102 and notifies the mode switching unit 111 when silence is detected. If the silent state continues for the first predetermined time (typically several tens to several hundreds of milliseconds), the silence detector 119 notifies the mode switching unit 111 that the silence has continued for the first predetermined time.

Referring again to FIG. 2, the RTP controller 11 receives RTP packets from the DSP unit 10, sets a destination address, and sends the received RTP packets to the IP network 5 through the WAN port 13. The RTP controller 11 also receives RTP packets from the IP network 5 through the WAN port 13 and transfers the received RTP packets to the DSP unit 10.

The SLIC 12 sends the facsimile terminal 1 analog signals created by the encoder 102 in the DSP unit 10 from voice data, facsimile data, facsimile tone data, and silent data. The SLIC 12 also sends the encoder 102 analog signals received from the facsimile terminal 1, including voice signals, facsimile signals, and a facsimile tone signals.

The WAN port 13 transfers packets received from the IP network 5 to the RTP controller 11 and sends packets received from the RTP controller 11 to the IP network 5.

Next, the control operations by which the communication device in the first embodiment solves the problems addressed by the invention will be described. The operations to be described take place over two intervals of time. One interval, shown in FIG. 4, includes phase A, in which communication device 2 receives a facsimile tone (CED tone) from communication device 3 through the IP network 5, and phase B, in which communication device 2 performs and completes the pre-message procedure. The other interval, shown in FIG. 5, includes phase D, in which communication device 2 transmits a disconnection command (DCN) signal during facsimile communication sent from the facsimile terminal 1 to communication device 3 through the IP network 5 and to the facsimile terminal 4, and phase E, in which communication device 2 is switched to voice mode.

The communication device also performs various conventional control operations, descriptions of which will be omitted, except to note that the communication device does not detect the DCN signal.

Figure 4:
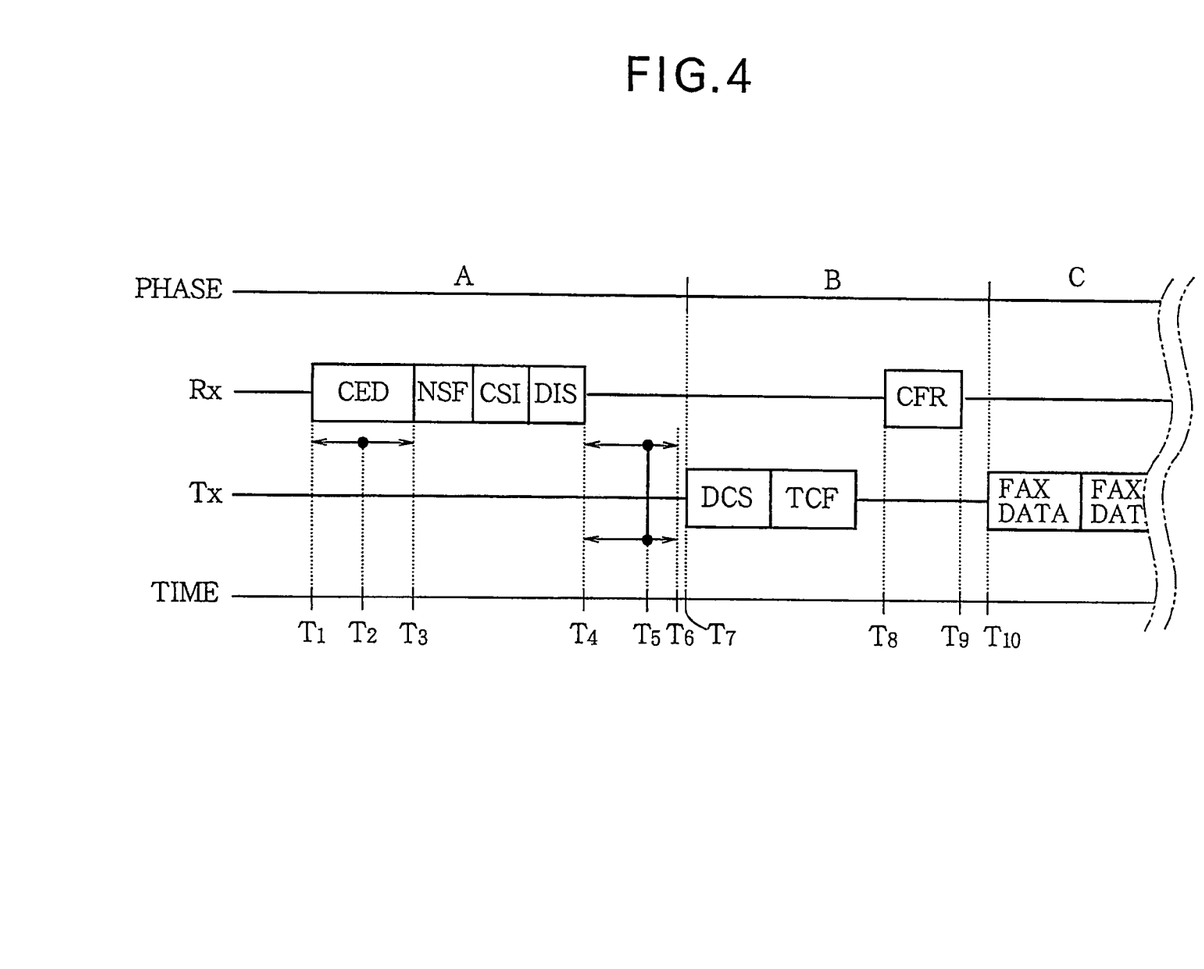
FIG. 4 and FIG. 5 illustrate communication control by the communication device.
Figure 5:
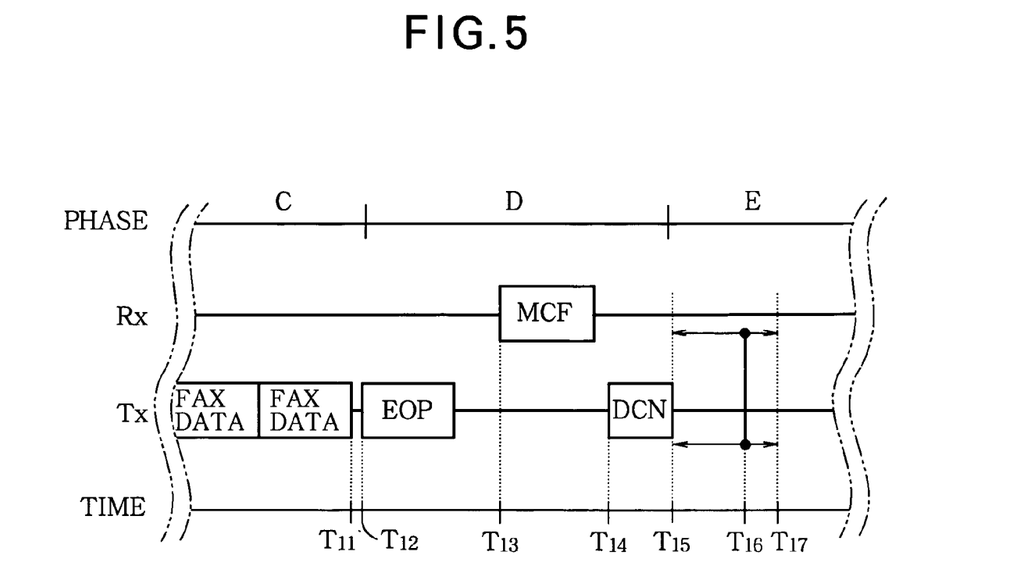

FIGS. 4 and 5 constitute two parts of a single timing diagram which also shows the beginning and end of phase C. In this timing diagram, phases A to E are indicated in the top row, signals received by communication device 2 from communication device 3 are indicated in the second row (marked 'Rx'), signals sent by communication device 2 to communication device 3 are indicated in the third row (marked 'Tx'), and times are designated in the bottom row (marked 'time').

The procedure starts when facsimile terminal 1 sends a calling tone through the communication devices 2, 3 to facsimile terminal 4. Output of the calling tone begins before time T1 in FIG. 4. The calling tone is not shown.

At time T1, facsimile terminal 4 begins sending a CED tone through the communication devices 3, 2 to facsimile terminal 1. The facsimile tone detector 118 in communication device 2 detects this facsimile tone from, for example, the envelope of the analog signal to which the facsimile tone is converted and confirms that the tone is a CED tone.

At time T2 the facsimile tone detector 118 notifies the mode switching unit 111 that a CED tone has been received, and the mode switching unit 111 activates the silence detector 119. Reception of the CED tone continues until time T3. Time T2 is an arbitrary time between time T2 and time T3, as indicated by the arrows.

Following the CED tone, a non-standard facilities (NSF) signal, a called subscriber identification (CSI) signal, and a digital identification signal (DIS) are sequentially sent from facsimile terminal 4 to facsimile terminal 1 through the communication devices 3, 2 during the interval from time T3 to time T4. Communication device 2 cannot identify these signals but can detect that the line is not silent because the silence detector 119 has already been activated.

At time T5, the silence detector 119 in communication device 2 detects that both the transmitted and received signals have become silent.

At time T6, the silence detector 119 in communication device 2 detects that the silence has continued for the first predetermined time, and notifies the mode switching unit 111. The mode switching unit 111 instructs the jitter buffer control unit 113 to output silent data with a predetermined fixed time length and also to deactivate the delay recovery control function 113a.

At time T7, facsimile terminal 1 begins sending a digital command signal (DCS) and a training check frame (TCF) signal through the communication devices 2, 3 to facsimile terminal 4.

At time T8, facsimile terminal 4 completes the training check and then begins sending a confirmation to receive (CFR) signal through the communication devices 3, 2 to facsimile terminal 1.

At time T9, facsimile terminal 1 completes the reception of the CFR signal.

At time T10, facsimile terminal 1 begins sending facsimile (FAX) data through the communication devices 2, 3 to facsimile terminal 4.

At time T11 in FIG. 5, facsimile terminal 1 finishes sending facsimile data through the communication devices 2, 3 to facsimile terminal 4.

At time T12, facsimile terminal 1 sends an end of page (EOP) or end of message (EOM) signal through the communication devices 2, 3 to facsimile terminal 4.

At time T13, facsimile terminal 4 recognizes the EOP or EOM signal and sends a message confirmation (MCF) signal through the communication devices 3, 2 to facsimile terminal 1.

At time T14, facsimile terminal 1 recognizes the MCF signal and sends a disconnection command (DCN) signal through the communication devices 2, 3 to facsimile terminal 4.

At time T15, the DCN signal ends. Communication device 2 cannot identify any of the above signals, but can detect the ensuing silence because the silence detector 119 has been activated.

At time T16, the silence detector 119 in communication device 2 detects that both the transmitted and received signals have become silent.

The mode switching unit 111 monitors the silence detector 119. At time T17, the silence detector 119 notifies the mode switching unit 111 that both the transmitted and received signals have been silent for the third predetermined time (several seconds). The mode switching unit 111 responds by instructing the jitter buffer control unit 113 to reactivate the delay recovery control function 113a to terminate the control operation of communication device 2.

Of the signals in FIGS. 4 and 5, the communication devices 2, 3 identify only the CED signal. They do not identify the NSF, CSI, DIS, DCS, TCF, CFR, EOP, MCF, and DCN signals and the facsimile data. The silence detector 119, however, recognizes whether or not signals are being sent, even though it cannot tell what the signals are, and is thereby able to detect silence.

In the procedure described above, the switchover from voice mode to facsimile mode is executed only if the silence detector detects bi-directional silence continuing for the first predetermined time after the facsimile tone detector has detected a CED tone during voice communication. Therefore, the switchover is not made until the phase-A facsimile tone (CED tone) transmission has ended and no more packets including facsimile tone data will arrive to disrupt operations in phase B.

The switchover from facsimile mode to voice mode is made at the point when the silence detector detects bi-directional silence continuing for the third predetermined time during facsimile communication, regardless of whether or not a DCN signal is received. Therefore, if the line is left connected and the parties begin communicating by voice, they can do so with the assistance of the echo canceler 116 and delay recovery control function 113a, and thus without being troubled by echo or jitter buffer overflow problems, even though no DCN signal has been sent to announce the end of facsimile communication.

In the procedure illustrated above, the DCN signal was sent from facsimile terminal 1 to facsimile terminal 4, but communication devices 2, 3 operate in the same way regardless of whether the DCN signal is sent from facsimile terminal 1 to facsimile terminal 4, from facsimile terminal 4 to facsimile terminal 1, or in neither direction.

In the exemplary procedure described above the invention is applied to group 3 (G3) facsimile communication, but this is not a limitation; the invention can also be applied to Super G3 facsimile communication. When the invention is applied to Super G3 facsimile communication, the CED tone is replaced with an amplitude modulated answering (ANSam) tone, which requires the echo canceller to be controlled accordingly, where the ANSam tone is a signal having an inverted phase as stipulated in ITU-T recommendation G.168. Further, although in G3 facsimile communication the silence detector 119 must detect silence in both directions, the Super G3 facsimile communication method allows the delay recovery control function to be deactivated when the distant communication device has remained silent for a predetermined time, regardless of whether the local communication device is silent or not. (When reactivating the delay recovery control function, silence in both the communication device and the distant communication device must be detected as required by ITU-T recommendation G.168.)

The invention can also be applied in communication devices that perform both G3 and Super G3 facsimile communication.

Those skilled in the art will recognize that further variations are possible within the scope of the invention, which is defined in the appended claims.

What is claimed is:

1. A communication device for transmitting voice and facsimile signals between a terminal device to which the communication device is connected and a distant device to which the communication device is connected by a voice communication channel in a packet network, the communication device having an echo canceler and a jitter buffer, the jitter buffer having a delay recovery control function that selectively deletes data from the jitter buffer to recover from packet delays, the communication device comprising:
   a facsimile tone detector for detecting a facsimile tone from a packet received from the distant device through the voice communication channel;
   a silence detector for detecting silence immediately after the facsimile tone is detected by the facsimile tone detector; and
   a jitter buffer control unit for, when the silence detected by the silence detector continues for a first predetermined time, deactivating the delay recovery control function and causing the jitter buffer to output silent data for a second predetermined time, wherein
   the jitter buffer control unit reactivates the delay recovery control function if the silence detector detects silence continuing for a third predetermined time during facsimile communication.

2. The communication device of claim 1, wherein the first predetermined time is less than one second.

3. The communication device of claim 1, wherein the third predetermined time is greater than one second.

4. The communication device of claim 1, wherein the packet network employs an Internet protocol.

5. The communication device of claim 4, wherein the communication device employs a realtime transport protocol for communication with the distant device.

6. A communication device for transmitting voice and facsimile signals between a terminal device to which the communication device is connected and a distant device to which the communication device is connected by a voice communication channel in a packet network, the communication device having an echo canceler and a jitter buffer, the jitter buffer having a delay recovery control function that selectively deletes data from the jitter buffer to recover from packet delays, the communication device comprising:
   a facsimile tone detector for detecting a facsimile tone from a packet received from the distant device through the voice communication channel;
   a silence detector for detecting silence immediately after the facsimile tone is detected by the facsimile tone detector;
   a jitter buffer control unit for, when the silence detected by the silence detector continues for a first predetermined time, deactivating the delay recovery control function and causing the jitter buffer to output silent data for a second predetermined time; and
   an echo canceler control unit for deactivating the echo canceler when the facsimile tone detector detects an answering tone as the facsimile tone, wherein
   if the silence detector detects silence continuing for a third predetermined duration of time during facsimile communication, the echo canceler control unit reactivates the echo canceler and the jitter buffer control unit reactivates the delay recovery control function.

7. The communication device of claim 6, wherein the third predetermined duration of time is greater than one second.

8. A communication device for transmitting voice and facsimile signals between a terminal device to which the communication device is connected and a distant device to which the communication device is connected by a voice communication channel in a packet network, the communication device having an echo canceler and a jitter buffer, the jitter buffer having a delay recovery control function that selectively deletes data from the jitter buffer to recover from packet delays, the communication device comprising:

a facsimile tone detector for detecting a facsimile tone from a packet received from the distant device through the voice communication channel;

a silence detector for detecting silence immediately after the facsimile tone is detected by the facsimile tone detector; and a jitter buffer control unit for, when the silence detected by the silence detector continues for a first predetermined time, deactivating the delay recovery control function and causing the jitter buffer to output silent data for a second predetermined time, wherein the facsimile tone is an amplitude modulated answering (ANSam) tone, and the first predetermined time is a duration of time during which the distant device remains silent; and the jitter buffer control unit reactivates the delay recovery control function if the silence detector detects that both the communication device and the distant device are silent for a third predetermined duration of time during facsimile communication.

9. The communication device of claim 8, wherein the third predetermined duration of time is greater than one second.

* * * * *